United States Patent
Schwarz et al.

(10) Patent No.: US 12,205,333 B2
(45) Date of Patent: Jan. 21, 2025

(54) METHOD, AN APPARATUS AND A COMPUTER PROGRAM PRODUCT FOR VOLUMETRIC VIDEO ENCODING AND DECODING

(71) Applicant: Nokia Technologies Oy, Espoo (FI)

(72) Inventors: Sebastian Schwarz, Unterhaching (DE); Kimmo Roimela, Tampere (FI); Lauri Ilola, Munich (DE); Lukasz Kondrad, Munich (DE)

(73) Assignee: Nokia Technologies Oy, Espoo (FI)

( * ) Notice: Subject to any disclaimer, the term of this patent is extended or adjusted under 35 U.S.C. 154(b) by 183 days.

(21) Appl. No.: 17/790,370

(22) PCT Filed: Dec. 7, 2020

(86) PCT No.: PCT/FI2020/050820
§ 371 (c)(1),
(2) Date: Jun. 30, 2022

(87) PCT Pub. No.: WO2021/136878
PCT Pub. Date: Jul. 8, 2021

(65) Prior Publication Data
US 2023/0068178 A1   Mar. 2, 2023

(30) Foreign Application Priority Data
Jan. 2, 2020   (FI) .................................... 20205002

(51) Int. Cl.
*G06T 9/00*   (2006.01)
*G06T 17/20*   (2006.01)
(Continued)

(52) U.S. Cl.
CPC .............. *G06T 9/001* (2013.01); *G06T 17/20* (2013.01); *H04N 13/388* (2018.05); *H04N 19/597* (2014.11)

(58) Field of Classification Search
CPC ....... G06T 9/001; G06T 17/20; H04N 13/388; H04N 19/597; H04N 19/186; H04N 13/239; H04N 19/70
See application file for complete search history.

(56) References Cited

U.S. PATENT DOCUMENTS 10,552,987 B2 *   2/2020   Laroche .................. G06T 17/20
11,398,059 B2 *   7/2022   Zhao ....................... G06T 15/00
(Continued)

FOREIGN PATENT DOCUMENTS

EP   2833326 A1   2/2015
WO   2018/208698 A1   11/2018

OTHER PUBLICATIONS

"Information technology—Coded Representation of Immersive Media—Part 5: Video-based Point Cloud Compression", ISO/IEC JTC1/SC29/WG11, ISO/IEC 23090-5, 2019, 102 pages.
(Continued)

*Primary Examiner* — Michael Le
(74) *Attorney, Agent, or Firm* — Joseph C. Drish; McCarter & English, LLP

(57) ABSTRACT

A method and technical equipment for encoding, where the method comprises at least receiving a video presentation frame, where the video presentation represents a three-dimensional data in the form of mesh data (810); separating from the mesh data information on vertices, wherein the information comprises at least connectivity data defining connections between vertices (820); determining parameters relating to said connectivity data (830); encoding the parameters to a first bitstream as a video component (840); and storing the encoded first bitstream for transmission to a rendering apparatus (850). In addition to encoding, also decoding is disclosed.

18 Claims, 11 Drawing Sheets

(51) Int. Cl.
*H04N 13/388* (2018.01)
*H04N 19/597* (2014.01)

(56) References Cited

U.S. PATENT DOCUMENTS

| | | | |
|---|---|---|---|
| 2002/0063707 A1 | 5/2002 | Kawanaka | |
| 2014/0092439 A1* | 4/2014 | Krig | H04N 13/161 348/43 |
| 2017/0091997 A1* | 3/2017 | Tuffreau | G06T 7/60 |
| 2017/0124761 A1 | 5/2017 | Michel et al. | |
| 2018/0152688 A1 | 5/2018 | Graziosi | |
| 2018/0232912 A1* | 8/2018 | Nevraev | G06T 15/80 |
| 2018/0253867 A1* | 9/2018 | Laroche | G06T 17/20 |
| 2018/0268570 A1* | 9/2018 | Budagavi | G06T 9/001 |
| 2019/0122393 A1* | 4/2019 | Sinharoy | G06T 5/77 |
| 2020/0211230 A1* | 7/2020 | Zhao | G06T 17/20 |

OTHER PUBLICATIONS

"Polygon Mesh", Wikipedia, Retrieved on Jun. 16, 2022, Webpage available at : https://en.wikipedia.org/wiki/Polygon_mesh.

"Attribution—ShareAlike 3.0 Unported (CC BY-SA 3.0)", Creative Commons, Retrieved on Jun. 16, 2022, Webpage available at : https://creativecommons.org/licenses/by-sa/3.0/.

Zakharchenko, "V-PCC Codec description", 3DG, ISO/IEC JTC1/SC29/WG11 MPEG2018/N18017, Oct. 2018, 32 pages.

Faramarzi et al., "[V-PCC] EE2.6 Report on mesh coding with V-PCC", Samsung Electronics, ISO/IEC JTC1/SC29/ WG11 MPEG2019/m49588, Jul. 2019, 7 pages.

"Google Draco", Github, Retrieved on Jun. 16, 2022, Webpage available at : https://github.com/google/draco.

Office action received for corresponding Finnish U.S. Appl. No. 20/205,002, dated Jul. 16, 2020, 11 pages.

Kubola et al., "Connectivity compression for three-dimensional planar triangle meshes", Ninth International Conference on Information Visualisation (IV'05), Jul. 6-8, 2005, 5 pages.

Pietikainen et al., "Two decades of local binary patterns: A survey", arXiv, Nov. 10, 2016, pp. 1-34.

Zakharchenko et al., "V-PCC Codec Description", 3DG, ISO/IEC JTC1/SC29/WG11 MPEG2019/N18190, Jan. 2019, 38 pages.

International Search Report and Written Opinion received for corresponding Patent Cooperation Treaty Application No. PCT/FI2020/050820, dated May 27, 2021, 17 pages.

Rhyu et al., "International Organisation for Standardisation Organisation Internationale De Normalisation ISO/IEC JTC1/SC29/WG11CODING of Moving Pictures and Audio", ISO/IEC JTC1/SC29/WG11 m47608 Samsung electronics, Mar. 2019, pp. 1-3.

Extended European Search Report received for corresponding European Patent Application No. 20910946.1, dated Dec. 8, 2023, 8 pages.

* cited by examiner

METHOD, AN APPARATUS AND A COMPUTER PROGRAM PRODUCT FOR VOLUMETRIC VIDEO ENCODING AND DECODING

RELATED APPLICATION

This application was originally filed as PCT Application No.PCT/FI2020/050820, filed on Dec. 7, 2020, which claims priority from Finnish Application No. 20205002, filed on Jan. 2, 2020, each of which is incorporated herein by reference in its entirety.

TECHNICAL FIELD

The present solution generally relates to volumetric video coding.

BACKGROUND

Since the beginning of photography and cinematography, the most common type of image and video content has been captured by cameras with relatively narrow field of view, and displayed as a rectangular scene on flat displays. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method for encoding, comprising at least receiving a video presentation frame, where the video presentation represents a three-dimensional data in the form of mesh data; separating from the mesh data information on vertices, wherein the information comprises at least connectivity data defining connections between vertices; determining parameters relating to said connectivity data; encoding the parameters to a first bitstream as a video component; and storing the encoded first bitstream for transmission to a rendering apparatus.

According to a second aspect there is provided an apparatus for encoding a bitstream, comprising at least means for receiving a video presentation frame, where the video presentation represents a three-dimensional data in the form of mesh data; means for separating from the mesh data information on vertices, wherein the information comprises at least connectivity data defining connections between vertices; means for determining parameters relating to said connectivity data; means for encoding the parameters to a first bitstream as a video component; and means for storing the encoded first bitstream for transmission to a rendering apparatus.

According to a third aspect there is provided an apparatus comprising at least one processor, and a memory including a computer program code, wherein the processor may further comprise processor circuitry. The memory and the computer program code are configured to, with the at least one processor, cause the apparatus to receive a video presentation frame, where the video presentation represents a three-dimensional data in the form of mesh data; separate from the mesh data information on vertices, wherein the information comprises at least connectivity data defining connections between vertices; determine parameters relating to said connectivity data; encode the parameters to a first bitstream as a video component; and store the encoded first bitstream for transmission to a rendering apparatus.

According to a fourth aspect there is provided a computer program product comprising computer program code configured to, when executed on at least one processor, cause an apparatus or a system to receive a video presentation frame, where the video presentation represents a three-dimensional data in the form of mesh data; separate from the mesh data information on vertices, wherein the information comprises at least connectivity data defining connections between vertices; determining parameters relating to said connectivity data; encode the parameters to a first bitstream as a video component; and store the encoded first bitstream for transmission to a rendering apparatus.

According to an embodiment, mesh connectivity table is used to generate mesh connectivity map; signaling per vertex indices of connected neighboring vertices; packing mesh connectivity information per vertex in a single byte; encoded as video component; enabling flexible signaling of mesh connectivity tables per atlas, per sequence, per frame, per tile group or per patch.

According to an embodiment, the connectivity data comprises number of edges per vertex as a value in luma channel.

According to an embodiment, the apparatus further comprises means for encapsulating the connectivity data in unused chroma channel of a geometry video.

According to an embodiment, the connectivity data is embedded in an occupancy map.

According to an embodiment, the information on vertices comprises also information on vertex coordinate and attributes, which are encoded to a second bitstream.

According to an embodiment, the apparatus further comprises means for creating a final encoded bitstream from the first and the second bitstreams.

According to an embodiment, the computer program product is embodied on a non-transitory computer readable medium.

According to fifth aspect, there is provided a method for decoding, comprising at least receiving a compressed bitstream relating to a video presentation; decoding from the received bitstream parameters relating to a connectivity data; wherein the connectivity data defines connections between vertices; using the connectivity data to reconstruct mesh data representing a three-dimensional data for a video presentation.

According to sixth aspect, there is provided an apparatus for decoding a bitstream, the apparatus comprising at least means for receiving a compressed bitstream relating to a video presentation; means for decoding from the received bitstream parameters relating to a connectivity data; wherein the connectivity data defines connections between vertices; means for using the connectivity data to reconstruct mesh data representing a three-dimensional data for a video presentation.

According to seventh aspect, there is provided an apparatus for decoding a bitstream, the apparatus comprising at least one processor, and a memory including a computer program code, wherein the processor may further comprise processor circuitry. The memory and the computer program code are configured to, with the at least one processor, cause the apparatus to receive a compressed bitstream relating to a video presentation; decode from the received bitstream parameters relating to a connectivity data; wherein the connectivity data defines connections between vertices; use the connectivity data to reconstruct mesh data representing a three-dimensional data for a video presentation.

According to an eighth aspect there is provided a computer program product comprising computer program code configured to, when executed on at least one processor, cause an apparatus or a system to receive a compressed bitstream relating to a video presentation; decode from the received bitstream parameters relating to a connectivity data; wherein the connectivity data defines connections between vertices; use the connectivity data to reconstruct mesh data representing a three-dimensional data for a video presentation.

According to an embodiment, mesh edges are predicted based on the connectivity data, wherein the predicting comprises decoding vertex locations; reconstructing the vertex locations into a three-dimensional mesh frame; comparing the reconstructed three-dimensional mesh frame to an original input mesh frame to generate a vertex correspondence; and forming a mesh edge residual map based on the vertex correspondence.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
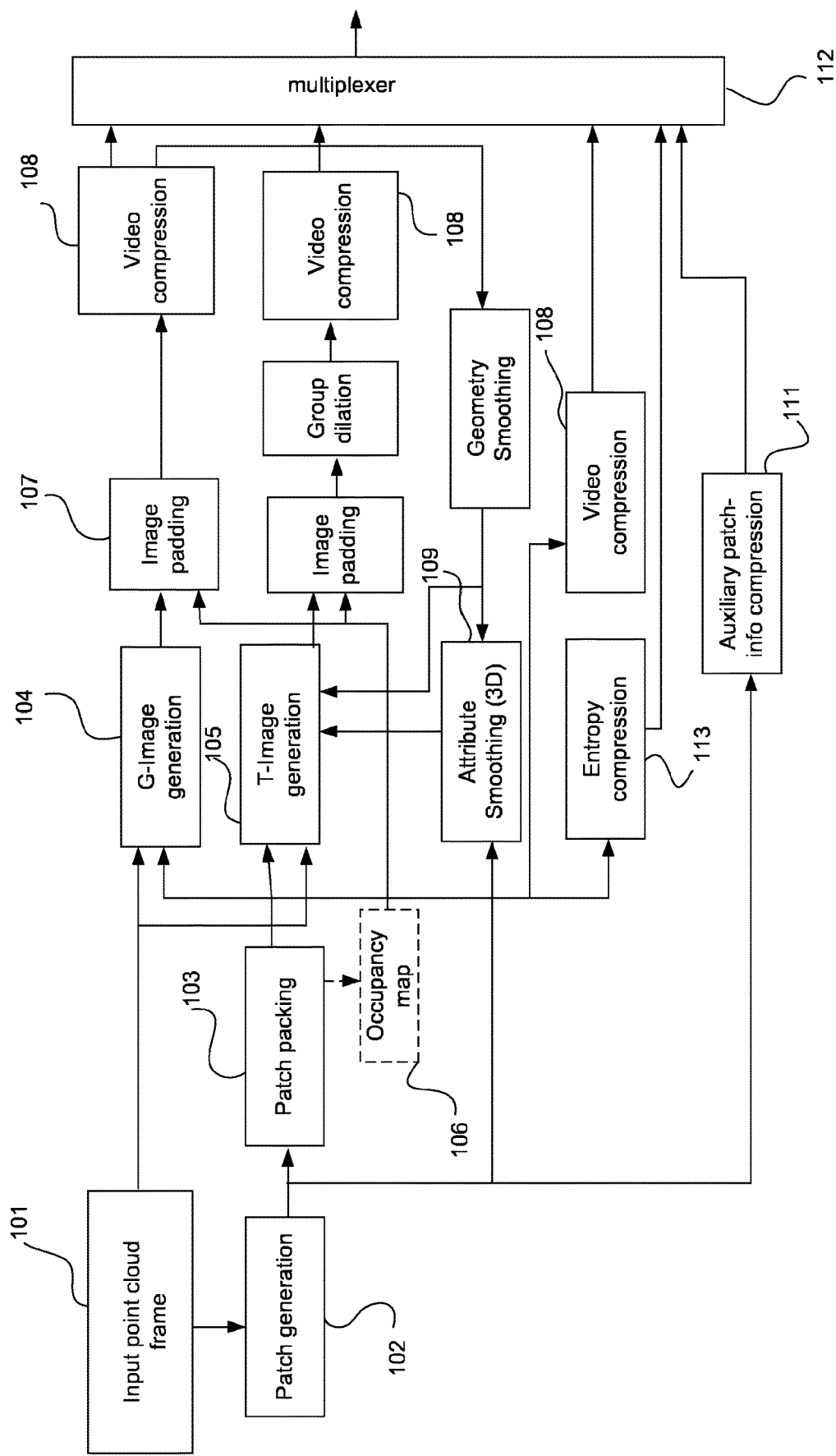
FIG. 1 shows an example of an encoding process.

In the following, several embodiments will be described in the context of digital volumetric video. In particular, the several embodiments enable encoding and decoding of digital volumetric video material. The present embodiments are applicable e.g. in the MPEG Video-Based Point Cloud Coding (V-PCC).

Volumetric video may be captured using one or more three-dimensional (3D) cameras. When multiple cameras are in use, the captured footage is synchronized so that the cameras provide different viewpoints to the same world. In contrast to traditional two-dimensional/tree-dimensional (2D/3D) video, volumetric video describes a 3D model of the world where the viewer is free to move and observe different parts of the world.

Volumetric video enables the viewer to move in six degrees of freedom (DOF): in contrast to common 360° video, where the user has from 2 to 3 degrees of freedom (yaw, pitch, and possibly roll), a volumetric video represents a 3D volume of shape rather than a flat image plane. Volumetric video frames contain a large amount of data because they model the contents of a 3D volume instead of just a 2D plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstructing techniques such as structure from motion, or captured with a combination of cameras and depth sensors such as LiDAR, for example.

Volumetric video data represents a three-dimensional scene or object, and can be used as input for augmented reality (AR), virtual reality (VR) and mixed reality (MR) applications. Such data describes geometry (shape, size, position in 3D space) and respective attributes (e.g. color, opacity, reflectance, . . . ). In addition, the volumetric video data can define any possible temporal changes of the geometry and attributes at given time instances (such as frames in 2D video). Volumetric video can be generated from 3D models, i.e. computer-generated imaginary (CGI), or captured from real-world scenes using a variety of capture solutions, e.g. multi-camera, laser scan, combination of video and dedicated depth sensors, and more. Also, a combination of CGI and real-world data is possible. Examples of representation formats for such volumetric data comprises triangle meshes, point clouds, or voxel. Temporal information about the scene can be included in the form of individual capture instances, i.e. "frames" in 2D video, or other means, e.g. position of an object as a function of time.

Because volumetric video describes a 3D scene (or object), such data can be viewed from any viewpoint. Therefore, volumetric video is an important format for any AR, VR, or MR applications, especially for providing 6DOF viewing capabilities.

Increasing computational resources and advances in 3D data acquisition devices has enabled reconstruction of highly detailed volumetric video representations of natural scenes. Infrared, lasers, time-of-flight and structured light are examples of devices that can be used to construct 3D video data. Representation of the 3D data depends on how the 3D data is used. Dense Voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is to code the 3D data as a set of texture and depth map as is the case in the multi-view plus depth. Closely related to the techniques used in multi-view plus depth is the use of elevation maps, and multi-level surface maps.

In 3D point clouds, each point of each 3D surface is described as a 3D point with color and/or other attribute information such as surface normal or material reflectance. Point cloud is a set of data points (i.e. locations) in a coordinate system, for example in a three-dimensional coordinate system being defined by X, Y, and Z coordinates. The points may represent an external surface of an object in the screen space, e.g. in a 3D space. A point may be associated with a vector of attributes. A point cloud can be used to reconstruct an object or a scene as a composition of the points. Point clouds can be captured by using multiple cameras and depth sensors. A dynamic point cloud is a sequence of static point clouds, wherein each static point cloud is in its own "point cloud frame".

In dense point clouds or voxel arrays, the reconstructed 3D scene may contain tens or even hundreds of millions of points. If such representation are to be stored or interchanged between entities, then efficient compression is needed. Volumetric video representation formats, such as point clouds, meshes, voxel, does not have a sufficient temporal compression performance. Identifying correspondences for motion-compensation in 3D-space is an ill-defined problem, as both geometry and respective attributes may change. For example, temporal successive point cloud frames do not necessarily have the same number of meshes, points or voxel. Therefore, compression of dynamic 3D scenes is inefficient. Approaches for compressing volumetric data that are based on 2D video, i.e. multiview and depth, have better compression efficiency, but rarely cover the full scene. Therefore, they provide only limited 6DOF capabilities.

Instead of the above-mentioned approach, a 3D scene, represented as meshes, points, and/or voxel, can be projected onto one or more geometries. These geometries can be "unfolded" onto 2D planes (two planes per geometry: one for texture, one for depth), which may then be encoded using standard 2D video compression technologies. Relevant projection geometry information may be transmitted alongside the encoded video files to the decoder. The decoder may decode the video and perform the inverse projection to regenerate the 3D scene in any desired representation format (not necessarily the starting format).

Projecting volumetric models onto 2D planes allows for using standard 2D video coding tools with highly efficient temporal compression. Thus, coding efficiency is increased greatly. Using geometry-projections instead of known 2D-video based approaches, i.e. multiview and depth, provide a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and reverse projection steps are of low complexity.

A polygon mesh is a collection of vertices, edges and faces that defines the shape of a polyhedral object in 3D computer graphics and solid modelling. The faces usually consist of triangles (triangle mesh), quadrilaterals (quads), or other simple convex polygons (n-gons), since this simplifies rendering, but may also be more generally composed of concave polygons, or even polygons with holes.

Objects created with polygon meshes are represented by different types of elements. These include vertices, edges, faces, polygons and surfaces. In many applications, only vertices, edges and either faces or polygons are stored.

Vertex defines a position, i.e. a point, in a 3D space defined as (x, y, z) along with other information such as color (r, g, b), normal vector and texture coordinates.

Edge is a connection between two vertices, wherein the two vertices are endpoints of the edge.

Face is a closed set of edges, in which a triangle face has three edges, and a quad face has four edges. A polygon is a coplanar set of faces. In systems that support multi-sided faces, polygons and faces are equivalent. Mathematically a polygonal mesh may be considered an unstructured grid, or undirected graph, with additional properties of geometry, shape and topology.

Surfaces, i.e. smoothing groups, may be used to form a discrete representation of the faces. Smoothing groups are useful, but it is not required to group smooth regions.

Some mesh formats contain groups, which define separate elements of the mesh, and are useful for determining separate sub-objects for skeletal animation or separate actors for non-skeletal animation.

Materials are defined to allow different portions of the mesh to use different shaders when rendered.

Most mesh formats also support some form of UV coordinates ("U" and "V" denoting axes of 2D texture) which are a separate 2D representation of the mesh "unfolded" to show what portion of a 2-dimensional texture map to apply to different polygons of the mesh. It is also possible for meshes to contain other such vertex attribute information such as colour, tangent vectors, weight maps to control animation, etc. (sometimes also called channels).

An overview of a compression process is shortly discussed next. Such process may be applied for example in V-PCC. At the encoding stage, the input point cloud frame is processed in a following manner: First the volumetric 3D data may be represented as a set of 3D projections in different components. At the separation stage, image is decomposed into far and near components for geometry and corresponding attributes components, in addition an occupancy map 2D image may be created to indicate parts of an image that shall be used. The 2D projection is composed of independent patches based on geometry characteristics of the input point cloud frame. After the patches have been generated and 2D frames for video encoding have been created, the occupancy map, geometry information and the auxiliary information may be compressed. At the end of the process, the separate bitstreams are multiplexed into the output compressed binary file.

FIG. 1 shows the encoding process in more detailed manner.

The process starts with an input frame representing a point cloud frame 101 that is provided for patch generation 102, geometry image generation 104 and texture image generation 105. Each point cloud frame 101 represents a dataset of points within a 3D volumetric space that has unique coordinates and attributes.

The patch generation 102 process decomposes the point cloud frame 101 by converting 3D samples to 2D samples on a given projection plane using a strategy which provides the best compression. According to an example, patch generation 102 process aims at decomposing the point cloud frame 101 into a minimum number of patches with smooth boundaries, while also minimizing the reconstruction error.

At the initial stage of the patch generation 102, a normal per each point is estimated. The tangent plane and its corresponding normal are defined per each point, based on the point's nearest neighbors m within a predefined search distance. A k-dimensional tree may be used to separate the data and find neighbors in a vicinity of a point $p_i$ and a barycenter $c=\bar{p}$ of that set of points is used to define the normal. The barycenter c may be computed as follows:

$$c = \bar{p} = \frac{1}{m}\sum_{i=1}^{m} p_i$$

The normal is estimated from eigen decomposition for the defined point cloud as:

$$\sum_{i=1}^{m}(p_i - \bar{p})(p_i - \bar{p})^T$$

Based on this information, each point is associated with a corresponding plane of a point cloud bounding box. Each plane is defined by a corresponding normal $\vec{n}_{Pidx}$ with values:
(1.0, 0.0, 0.0),
(0.0, 1.0, 0.0),
(0.0, 0.0, 1.0),
(−1.0, 0.0, 0.0),
(0.0, −1.0, 0.0),
(0.0, 0.0, −1.0)

More precisely, each point may be associated with the plane that has the closest normal (i.e. maximizes the dot product of the point normal $\vec{n}_{p_i}$ and the plane normal $\vec{n}_{P_{idx}}$).

$$\max_{p_{idx}}\{\vec{n}_{p_i} \cdot \vec{n}_{p_{idx}}\}$$

The sign of the normal is defined depending on the point's position in relationship to the "center".

The initial clustering may then be refined by iteratively updating the cluster index associated with each point based on its normal and the cluster indices of its nearest neighbors. The final step of the patch generation 102 may comprise extracting patches by applying a connected component extraction procedure.

Patch info determined at patch generation 102 for the input point cloud frame 101 is delivered to patch packing 103, to geometry image generation 104, to texture image generation 105, to attribute smoothing (3D) 109 and to auxiliary patch info compression 113. The patch packing 103 aims at generating the geometry and texture maps, by appropriately considering the generated patches and by trying to efficiently place the geometry and texture data that correspond to each patch onto a 2D grid of size W×H. Such placement also accounts for a user-defined minimum size block T×T (e.g. 16×16), which specifies the minimum distance between distinct patches as placed on this 2D grid. Parameter T may be encoded in the bitstream and sent to the decoder.

The packing process 103 may iteratively try to insert patches into a W×H grid. W and H are user defined parameters, which correspond to the resolution of the geometry/texture images that will be encoded. The patch location may be determined through an exhaustive search that may be performed in raster scan order. Initially, patches are placed on a 2D grid in a manner that would guarantee non-overlapping insertion. Samples belonging to a patch (rounded to a value that is a multiple of T) are considered as occupied blocks. In addition, a safeguard between adjacent patches is forced to distance of at least one block being multiple of T. Patches are processed in an orderly manner, based on the patch index list. Each patch from the list is iteratively placed on the grid. The grid resolution depends on the original point cloud size and its width (W) and height (H) are transmitted to the decoder. In the case that there is no empty space available for the next patch the height value of the grid is initially doubled, and the insertion of this patch is evaluated again. If insertion of all patches is successful, then the height is trimmed to the minimum needed value. However, this value is not allowed to be set lower than the originally specified value in the encoder. The final values for W and H correspond to the frame resolution that is used to encode the texture and geometry video signals using the appropriate video codec.

Figure 2:
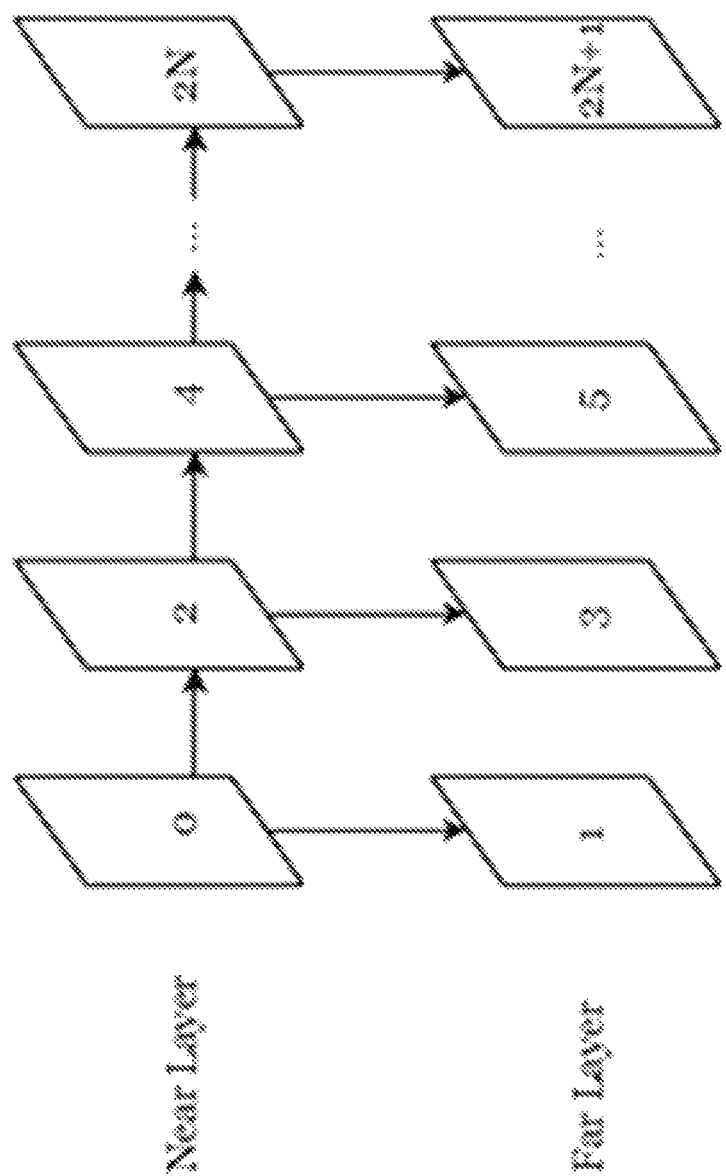
FIG. 2 shows an example of a layer projection structure.

The geometry image generation 104 and the texture image generation 105 are configured to generate geometry images and texture images. The image generation process may exploit the 3D to 2D mapping computed during the packing process to store the geometry and texture of the point cloud as images. In order to better handle the case of multiple points being projected to the same pixel, each patch may be projected onto two images, referred to as layers. For example, let H(u, y) be the set of points of the current patch that get projected to the same pixel (u, v). FIG. 2 illustrates an example of layer projection structure. The first layer, also called a near layer, stores the point of H(u, v) with the lowest depth D0. The second layers, referred to as the far layer, captures the point of H(u, v) with the highest depth within the interval [D0, D0+Δ], where Δ is a user-defined parameter that describes the surface thickness. The generated videos may have the following characteristics:
Geometry: W×H YUV420-8bit,
Texture: W×H YUV420-8bit, It is to be noticed that the geometry video is monochromatic. In addition, the texture generation procedure exploits the reconstructed/smoothed geometry in order to compute the colors to be associated with the re-sampled points.

The surface separation method is applied to prevent the mixing of different surfaces in the connected components when there is a stack of multiple different surfaces in that connected component. One of the methods to separate surfaces is to use differences of MSE values of points in RGB color domain:

Patch is separated if $MSE(R_1-R_2, G_1-G_2, B_1-B_2)$>Threshold;

Threshold=20 where $R_1$, $G_1$, $B_1$ are attribute values belonging to T0 and $R_2$, $G_2$, $B_2$ are the attribute values belonging to T1.

The geometry images and the texture images may be provided to image padding 107. The image padding 107 may also receive as an input an occupancy map (OM) 106 to be used with the geometry images and texture images. The occupancy map 106 may comprise a binary map that indicates for each cell of the grid whether it belongs to the empty space or to the point cloud. In other words, the occupancy map (OM) may be a binary image of binary values where the occupied pixels and non-occupied pixels are distinguished and depicted respectively. The occupancy map may alternatively comprise a non-binary image allowing additional information to be stored in it. Therefore, the representative values of the DOM may comprise binary values or other values, for example integer values. It should be noticed that one cell of the 2D grid may produce a pixel during the image generation process.

The padding process 107 aims at filling the empty space between patches in order to generate a piecewise smooth image suited for video compression. For example, in a simple padding strategy, each block of T×T (e.g. 16×16) pixels is compressed independently. If the block is empty (i.e. unoccupied, i.e. all its pixels belong to empty space), then the pixels of the block are filled by copying either the last row or column of the previous T×T block in raster order. If the block is full (i.e. occupied, i.e., no empty pixels), nothing is done. If the block has both empty and filled pixels (i.e. edge block), then the empty pixels are iteratively filled with the average value of their non-empty neighbors.

The padded geometry images and padded texture images may be provided for video compression 108. The generated images/layers may be stored as video frames and compressed using for example High Efficiency Video Coding (HEVC) Test Model 16 (HM) video codec according to the HM configurations provided as parameters. The video compression 108 also generates reconstructed geometry images to be provided for smoothing 109, wherein a smoothed geometry is determined based on the reconstructed geometry images and patch info from the patch generation 102. The smoothed geometry may be provided to texture image generation 105 to adapt the texture images.

The patch may be associated with auxiliary information being encoded/decoded for each patch as metadata. The auxiliary information may comprise index of the projection plane, 2D bounding box, 3D location of the patch represented in terms of depth $\delta 0$, tangential shift s0 and bitangential shift r0.

The following metadata may be encoded/decoded for every patch:
Index of the projection plane
  Index 0 for the planes (1.0, 0.0, 0.0) and (−1.0, 0.0, 0.0)
  Index 1 for the planes (0.0, 1.0, 0.0) and (0.0, −1.0, 0.0)
  Index 2 for the planes (0.0, 0.0, 1.0) and (0.0, 0.0, −1.0).
2D bounding box (u0, v0, u1, v1)
3D location (x0, y0, z0) of the patch represented in terms of depth $\delta 0$, tangential shift s0 and bi-tangential shift r0. According to the chosen projection planes, ($\delta 0$, s0, r0) are computed as follows:
  Index 0, $\delta 0$=x0, s0=z0 and r0=y0
  Index 1, $\delta 0$=y0, s0=z0 and r0=x0
  Index 2, $\delta 0$=z0, s0=x0 and r0=y0

Also, mapping information providing for each T×T block its associated patch index may be encoded as follows:
For each T×T block, let L be the ordered list of the indexes of the patches such that their 2D bounding box contains that block. The order in the list is the same as the order used to encode the 2D bounding boxes. L is called the list of candidate patches.

The empty space between patches is considered as a patch and is assigned the special index 0, which is added to the candidate patches list of all the blocks. Let I be index of the patch to which belongs the current T×T block and let J be the position of I in L. Instead of explicitly encoding the index I, its position J is arithmetically encoded instead, which leads to better compression efficiency.

The compression process may comprise one or more of the following example operations:
Binary values may be associated with B0×B0 sub-blocks belonging to the same T×T block. A value 1 associated with a sub-block, if it contains at least a non-padded pixel, and 0 otherwise. If a sub-block has a value of 1 it is said to be full, otherwise it is an empty sub-block.
If all the sub-blocks of a T×T block are full (i.e., have value 1). The block is said to be full. Otherwise, the block is said to be non-full.
A binary information may be encoded for each T×T block to indicate whether it is full or not.
If the block is non-full, an extra information indicating the location of the full/empty sub-blocks may be encoded as follows:
  Different traversal orders may be defined for the sub-blocks, for example horizontally, vertically, or diagonally starting from top right or top left corner
  The encoder chooses one of the traversal orders and may explicitly signal its index in the bitstream.
  The binary values associated with the sub-blocks may be encoded by using a run-length encoding strategy. The binary value of the initial sub-block is encoded. Continuous runs of 0s and 1s are detected, while following the traversal order selected by the encoder.
  The number of detected runs is encoded.
  The length of each run, except of the last one, is also encoded.

In occupancy map coding (lossy condition) a two-dimensional binary image of resolution (Width/B0)×(Height/B1), where Width and Height are the width and height of the geometry and texture images that are intended to be compressed. A sample equal to 1 means that the corresponding/co-located sample or samples in the geometry and texture image should be considered as point cloud points when decoding, while a sample equal to 0 should be ignored (commonly includes padding information). The resolution of the occupancy map does not have to be the same as those of the geometry and texture images and instead the occupancy map could be encoded with a precision of B0×B1 blocks. In order to achieve lossless encoding B0 and B1 are selected to be equal to 1. In practice, B0=B1=2 or B0=B1=4 can result in visually acceptable results, while significantly reducing the number of bits required to encode the occupancy map. The generated binary image covers only a single colour plane. However, given the prevalence of 4:2:0 codecs, it may be desirable to extend the image with "neutral" or fixed value chroma planes (e.g. add chroma planes with all sample values equal to 0 or 128, assuming the use of an 8-bit codec).

The obtained video frame may be compressed by using a video codec with lossless coding tool support (e.g., AVC, HEVC RExt, HEVC-SCC).

Occupancy map may be simplified by detecting empty and non-empty blocks of resolution T×T in the occupancy map and only for the non-empty blocks we encode their patch index as follows:
A list of candidate patches is created for each T×T block by considering all the patches that contain that block.
The list of candidates is sorted in the reverse order of the patches.
For each block,
  1. If the list of candidates has one index, then nothing is encoded.
  2. Otherwise, the index of the patch in this list is arithmetically encoded.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let (δ0, s0, r0) be the 3D location of the patch to which it belongs and (u0, v0, u1, v1) its 2D bounding box. P could be expressed in terms of depth δ(u, v), tangential shift s(u, v) and bi-tangential shift r(u, v) as follows:

$$\delta(u, v) = \delta 0 + g(u, v)$$

$$s(u, v) = s0 - u0 + u$$

$$r(u, v) = r0 - v0 + v$$

where g(u, v) is the luma component of the geometry image.

Attribute smoothing procedure 109 aims at alleviating potential discontinuities that may arise at the patch boundaries due to compression artifacts. The implemented approach moves boundary points to the centroid of their nearest neighbors.

A multiplexer 112 may receive a compressed geometry video and a compressed texture video from the video compression 108, and optionally a compressed auxiliary patch information from auxiliary patch-info compression 111. The multiplexer 112 uses the received data to produce a compressed bitstream.

Figure 3:
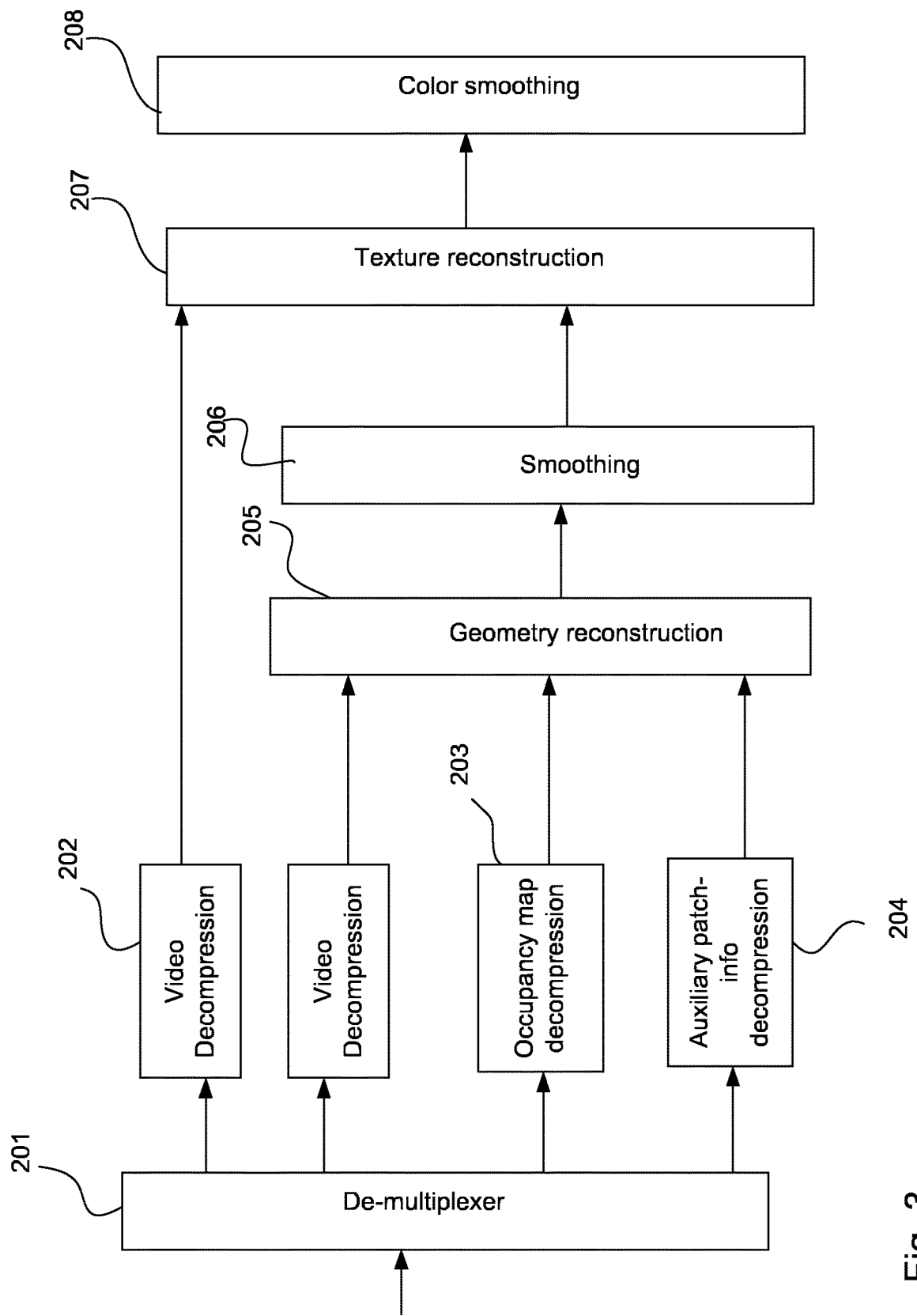
FIG. 3 shows an example of decoding process.

FIG. 3 illustrates an overview of a de-compression process for MPEG Point Cloud Coding (PCC). A de-multiplexer 201 receives a compressed bitstream, and after de-multiplexing, provides compressed texture video and compressed geometry video to video decompression 202. In addition, the de-multiplexer 201 transmits compressed occupancy map to occupancy map decompression 203. It may also transmit a compressed auxiliary patch information to auxiliary patch-info compression 204. Decompressed geometry video from the video decompression 202 is delivered to geometry reconstruction 205, as are the decompressed occupancy map and decompressed auxiliary patch information. The point cloud geometry reconstruction 205 process exploits the occupancy map information in order to detect the non-empty pixels in the geometry/texture images/layers. The 3D positions of the points associated with those pixels may be computed by leveraging the auxiliary patch information and the geometry images.

The reconstructed geometry image may be provided for smoothing 206, which aims at alleviating potential discontinuities that may arise at the patch boundaries due to compression artifacts. The implemented approach moves boundary points to the centroid of their nearest neighbors. The smoothed geometry may be transmitted to texture reconstruction 207, which also receives a decompressed texture video from video decompression 202. The texture values for the texture reconstruction are directly read from the texture images. The texture reconstruction 207 outputs a reconstructed point cloud for color smoothing 208, which further provides the reconstructed point cloud.

Coding of occupancy information can be performed with the geometry image. A specific depth value, e.g. 0, or a specific depth value range may be reserved to indicate that a pixel is inpainted and not present in the source material. The specific depth value or the specific depth value range may be pre-defined, for example in a standard, or the specific depth value or the specific depth value range may be encoded into or along the bitstream and/or may be decoded from or along the bitstream. This way of multiplexing the occupancy information in the depth sample array creates sharp edges into the images, which may be subject to additional bitrate as well as compression artefacts around the sharp edges.

One way to compress a time-varying volumetric scene/object is to project 3D surfaces on to some number of pre-defined 2D planes. Regular 2D video compression algorithms can then be used to compress various aspects of the projected surfaces. For example, a time-varying 3D point cloud with spatial and texture coordinates, can be mapped into a sequence of at least two sets of planes, where one of the two sets carry the texture data and the other carries the distance of the mapped 3D surface points from the projection planes.

For accurate 2D to 3D reconstruction at the receiving side, the decoder must be aware which 2D points are "valid" and which points stem from interpolating/padding. This requires the transmission of additional data. The additional data may be encapsulated in the geometry image as a pre-defined depth value (e.g. 0) or a pre-defined range of depth values. This will increase the coding efficiency only on the texture image, since the geometry image is not blurred/padded. Furthermore, encoding artefacts at the object boundaries of the geometry image may create severe artefacts, which require post-processing and may not be concealable.

Figure 4:
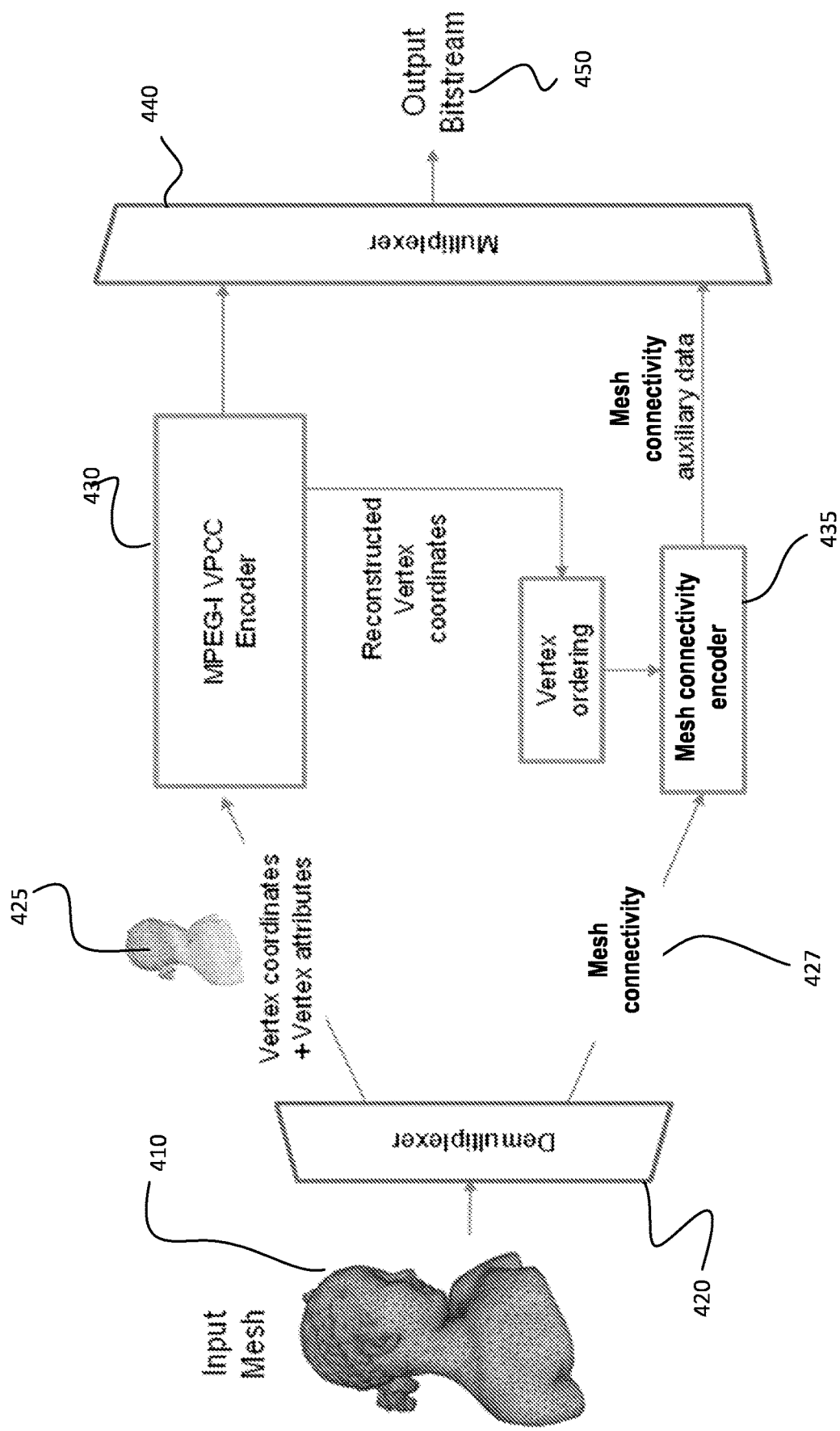
FIG. 4 shows an example of a mesh encoding.
Figure 5:
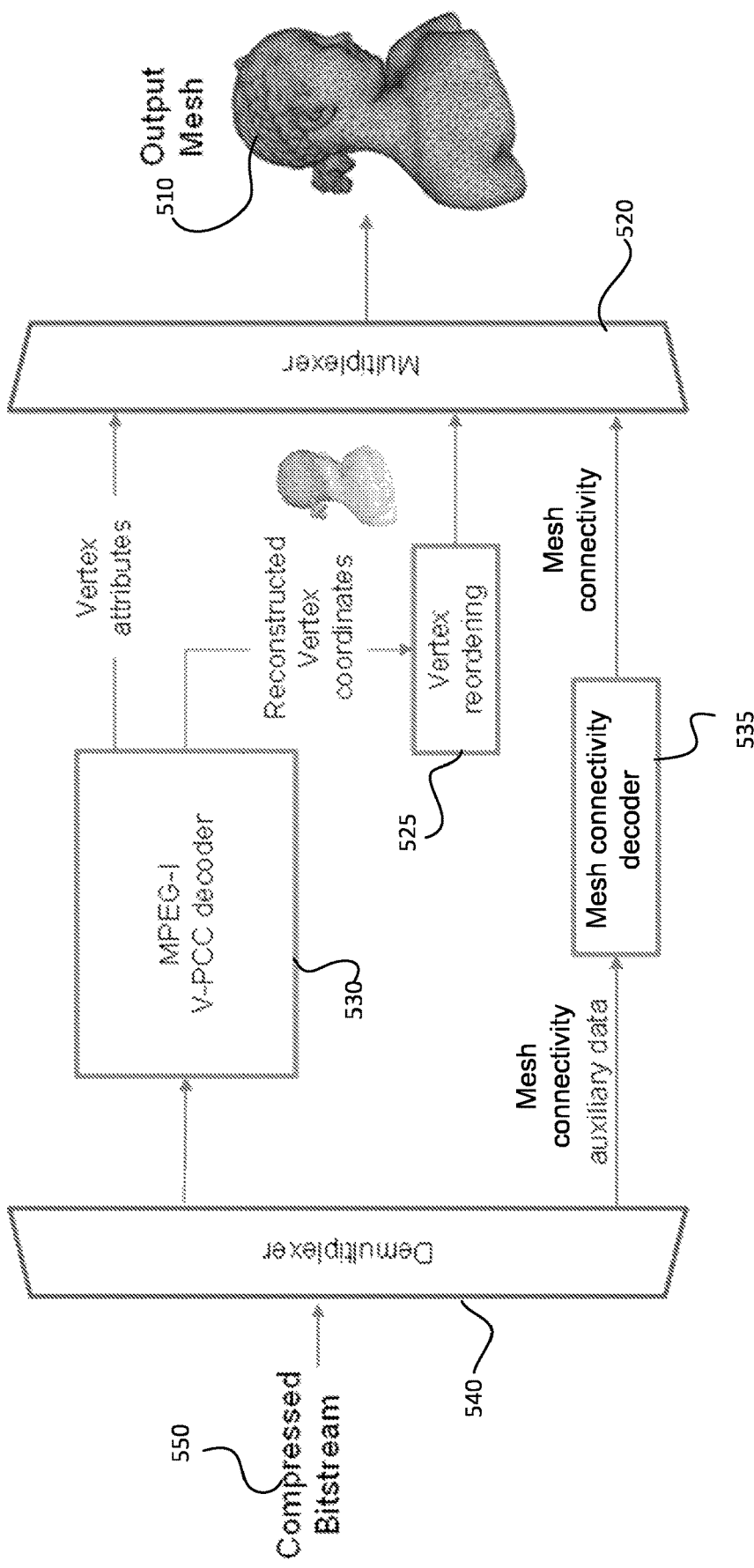
FIG. 5 shows an example of a mesh decoding.

FIGS. 4 and 5 show extensions to the V-PCC encoder and decoder, respectively, to support mesh encoding and mesh decoding, respectively.

In the encoder extension, shown in FIG. 4, the input mesh data 410 is demultiplexed 420 into vertex coordinate+attributes data 425 and mesh connectivity 427, where the mesh connectivity comprises vertex connectivity information. The vertex coordinate+attributes data 425 is coded using MPEG-I V-PCC 430 (such as shown in FIG. 1), whereas the mesh connectivity data 427 is coded in mesh connectivity encoder 435 as auxiliary data. Both of these are multiplexed 440 to create the final compressed output bitstream 450. Vertex ordering is carried out on the reconstructed vertex coordinates at the output of MPEG-I V-PCC to reorder the vertices for optimal mesh connectivity encoding.

In the decoder, shown in FIG. 5, the input bitstream 550 is demultiplexed 540 to generate the compressed bitstreams for vertex coordinates+attributes data and mesh connectivity. The vertex coordinates+attributes data is decompressed using MPEG-I V-PCC decoder 530. Vertex reordering 525 is carried out on the reconstructed vertex coordinates at the output of MPEG-I V-PCC decoder 530 to match the vertex order at the encoder. Mesh connectivity data is decompressed using mesh connectivity decoder 535. The decompressed data is multiplexed 520 to generate the reconstructed mesh 510.

V-PCC in its current form does not provide efficient tools to encode 3D mesh models, namely the "edge" connectivity information between vertices to form triangles.

The extension to V-PCC, shown in FIGS. 4 and 5, can carry this information, however, this might cause drawbacks. For example, vertices are coded lossless, thus no adaptation to different quality/bitrate scenarios is possible. In addition, a stand-alone mesh connectivity decoder is required, which increases complexity and device requirements.

Both drawbacks can be avoided by the present embodiments, where mesh connectivity information, i.e. connections between vertices, (residuals), i.e. edges, are signaled as additional video component, such as a 2D video track, carried as V-PCC attributes. This feature is different compared to three-dimensional point clouds transmitted using V-PCC.

In order to accomplish this, for the method for encoding, according to an embodiment, V-PCC is extended with additional attribute types to carry the mesh connectivity information. The specific attribute types, according to the present embodiments, are edges, e.g. ATTR_EDGE, and edge prediction residuals, e.g. ATTR_EDGE_RES, as shown in table 1, below:

TABLE 1

| ai_attribute_type_id[ j ][ i ] | Identifier | Attribute type |
|---|---|---|
| 0 | ATTRTEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |
| 5 | ATTR_EDGE | Edges |
| 6..8 | ATTR_EDGE_RES | Edge Residuals |
| 9...14 | ATTR_RESERVED | Reserved |

A. Transmission of Mesh Edges in V-PCC—Encoded as Video

According to an embodiment, the mesh connectivity information is encoded as a video component, where per vertex connections to neighboring vertices are signaled by per pixel indices. This component is defined as Mesh Connectivity Map. The following indexing logic may be used to generate mesh connectivity map. Each vertex in a geometry channel has at most eight neighboring vertices where it may connect to, so the connectivity information can be packed into a 8-bit bitmask per vertex. Each neighbor may be assigned a specific value 1, 2, 4, 8, 32, 64, 128.

Figure 6:
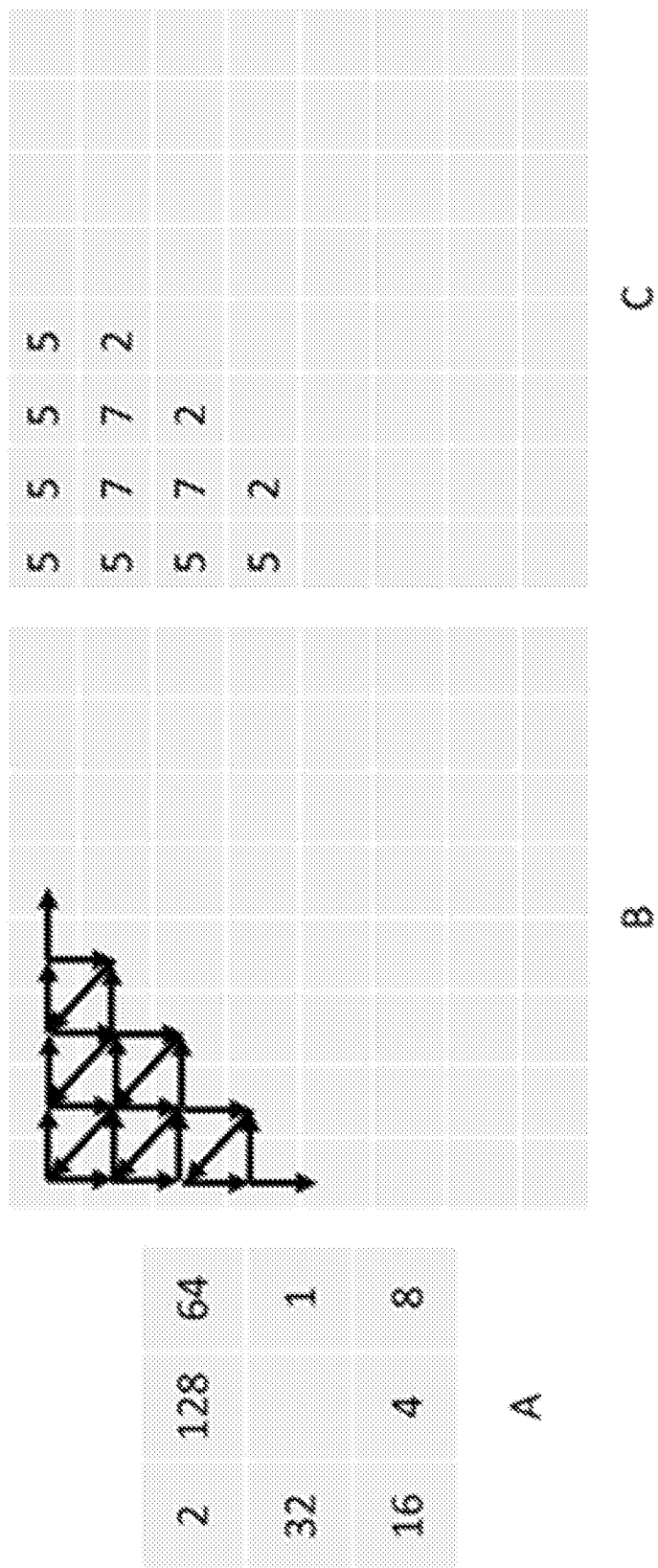
FIG. 6 shows an example of a mesh connectivity map.

FIG. 6 illustrates an example how the connections may be assigned to neighboring pixels. In this example, it is expected that the most common edge connection is to the pixel on the right. The values for the mesh connectivity map can be calculated based on the indices of the neighboring pixels to which edge connectivity exists. For example, A in FIG. 6 is an example of a mesh connectivity table, used for constructing mesh connectivity map. B in FIG. 6 represents how vertices on geometry map are connected to neighboring vertices. C in FIG. 6 illustrates the resulting mesh connectivity map. Values for mesh connectivity map C is the sum of all indices to neighboring vertices. Per mesh connectivity may be recovered by taking the sum from the mesh connectivity map and working backwards to factors of the sum. E.g. connectivity value 5 may only be reconstructed from 1 and 4. If the content is meshed responsible and the connectivity map is optimized, the content becomes well compressible with existing video coding technologies.

The values of the mesh connectivity table can be optimized per content, sequence, atlas, tile group or patch, in which case related signaling needs to be defined. This allows to minimize the value range of the mesh connectivity map, which may reduce the overall bitrate. The basic design of the mesh connectivity table structure is to assign values for each possible connection. The first value in mesh connectivity table array corresponds to first value in scanline ordered mesh connectivity table. Example definition for vpcc level signaling of the mesh connectivity table may be found below. In below example mesh connectivity table is included in a geometry_information( )structure that is part of vpcc_parameter_set( )structure as defined in 23090-5.

| | Descriptor |
|---|---|
| mesh_connectivity_table(atlasId){ | |
|   for( i = 0; i < 8; i++) { | |
|     mesh_connection_value[atlasId][ i ] | u(8) |
|   } | |
| } | |

| | Descriptor |
|---|---|
| geometry_information( atlasId ) { | |
|   gi_geometry_codec_id[ atlasId ] | u(8) |
|   gi_geometry_nominal_2d_bitdepth_minus1[ atlasId ] | u(5) |
|   gi_geometry_MSB_align_flag[ atlasId ] | u(1) |
|   gi_geometry_3d_coordinates_bitdepth_minus1[ atlasId ] | u(5) |
|   if( vps_raw_separate_video_present_flag[ atlasId ] ) | |
|     gi_raw_geometry_codec_id[ atlasId ] | u(8) |
|   mesh_connectivity_table(atlasId) | |
| } | |

Instead of vpcc level definitions the mesh connectivity table may be signaled on sequence level as part of atlas_sequence_parameter_set_rbsp( )or on frame level atlas_frame_parameter_set_rbsp( )as defined in 23090-5. Alternatively it may be signaled per tile group, in which case it may be stored in atlas_frame_tile_information( )as defined in 23090-5. If per patch signaling is preferred the table may be signaled in patch_data_unit( )as defined in 23090-5. If more flexible signaling structure is desired, SEI messaging as defined in 23090-5 may be utilized.

In a practical embodiment, the regular scanline grid order of the point cloud patch may be used to optimize the coding further by assuming that connections from any vertex will only be signaled down and/or to the right. Having vertex location (i, j) in the patch, the number of bits required can be reduced to four, with values 1, 2, 4 and 8 signalling connecting edges to pixels (i+1, j), (i+1, j+1), (i, j+1) and (i−1, j), for example. The edges connecting to vertex (i, j) from other direction will then be signaled in a different vertex.

Mesh connectivity map can be signaled at the same or lower resolution than the geometry map. In case of signaling mesh connectivity map at a lower resolution, it shall be scaled up to geometry map resolution during decoding. This may be beneficial if the mesh is constructed from a uniform grid of vertices, where the connectivity topology is the same for many vertices. Mesh connectivity information may be utilized during patch segmentation.

According to another embodiment, the mesh connectivity information may be embedded in occupancy map. Mesh connectivity map may be signaled in occupancy map, by defining 0 as an unoccupied pixel and requiring that there are no pixels without outgoing connectivity information. Signaling of embedded mesh connectivity may be done on vpcc-level inside occupancy_information( )structure as defined in 23090-5 by adding a single bit field like oi_mesh_connectivity_embedded.

| | Descriptor |
|---|---|
| occupancy_information( atlasId ) { | |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_occupancy_MSB_align_flag[ atlasId ] | u(1) |
|   oi_mesh_connectivity_embedded[ atlasId ] | u(1) |
| } | |

The mesh connectivity information, such as the aforementioned edges and edge prediction residuals, are stored in the encoded bitstream. Alternatively, the mesh connectivity information may be signaled with additional SEI message. Instead, the mesh connectivity information may be signaled per block level.

B. Transmission of Mesh Edges in V-PCC—Based on Nearest Neighbor

In the following embodiments, mesh vertices are encoded as points using V-PCC.

According to an embodiment, the number of edge connections per vertex is constant, i.e. on sequence-, frame-, or patch-level and signaled in the respective metadata. An example of possible signaling is presented below, where a new gi_geometry_mesh_connections field is introduced in geometry_information( ) structure defined in 23090-5.

|  | Descriptor |
|---|---|
| geometryinformation( atlasId ) { | |
| gi_geometry_codec_id[ atlasId ] | u(8) |
| gi_geometry_nominal_2d_bitdepth_minus1[ atlasId ] | u(5) |
| gi_geometry_MSB_align_flag[ atlasId ] | u(1) |
| gi_geometry_3d_coordinates_bitdepth_minus1[ atlasId ] | u(5) |
| if( vps_raw_separate_video_present_flag[ atlasId ] ) | |
| gi_raw_geometry_codec_id[ atlasId ] | u(8) |
| gi_geometry_mesh_connections[ atlasId ] | u(n) |
| } | |

In the table, parameter gi_geometry_mesh_connections indicates the numbers of mesh edges for each vertex on vpcc-level. Other signaling options may allow finer granularity, e.g. per sequence in atlas_sequence_parameter_set_rbsp( )structure, per frame in atlas_frame_parameter_set_rbsp( )structure, per tile group in atlas_frame_tile_information( ) structure, or per patch in patch_data_unit( )structure.

If various mesh connectivity signals are available, the finest level overrides the coarser level. This means that for example patch-level overrides settings on tile group-level or frame-level overrides settings on sequence-level.

According to an embodiment, the number of edges per vertex is encoded on a per-pixel level carried as an additional attribute video stream (i.e. ATTR-EDGE in Table 1, above). The edge connectivity video stream matches the geometry video stream but carries the number of edges per vertex as value in the luma channel. I.e. if a pixel representing a 3D vertex has four edge connections, "a 4" is coded in the luma channel.

According to another embodiment, the edge video stream has a lower resolution than the geometry video stream, similar to the occupancy video stream, and is treated in the same manner as a down-sampled occupancy video stream.

According to yet another embodiment, the edge information is encapsulated at a lower resolution in the unused chroma channels of the geometry video.

C. Prediction of Msh Edges in V-PCC

According to an embodiment, a decoder receives a V-PCC bitstream including edge connectivity information being signaled by any of the above-mentioned embodiments. The decoder is configured to reconstruct the 3D vertices, e.g. following to the Reconstruction process specified in ISO/IEC 23090-5:2019(E). Then, according to an embodiment, the decoder is configured to estimate edge connectivity information in the following manner:

1. Form 3D mesh

For every 3D vertex (3D point) do
   if value "a" for per-pixel mesh connections is available
     connect the vertex to its "a" nearest neighbors
   else
     if value "b" for per-patch mesh connections is available
       connect the vertex to its "b" nearest neighbors
     else
       if value "c" for per-frame mesh connections is available
         connect the vertex to its "c" nearest neighbors
       else
         if value "d" for per-sequence mesh connections is available
           connect the vertex to its "d" nearest neighbors 2. Interpolate Polygon Attribute For each closed polygon, interpolate attribute information (e.g. texture color, reflectance, etc.) from its enclosing vertices.

D. Prediction of Mesh Edges and Residual Signaling in V-PCC

Figure 7:
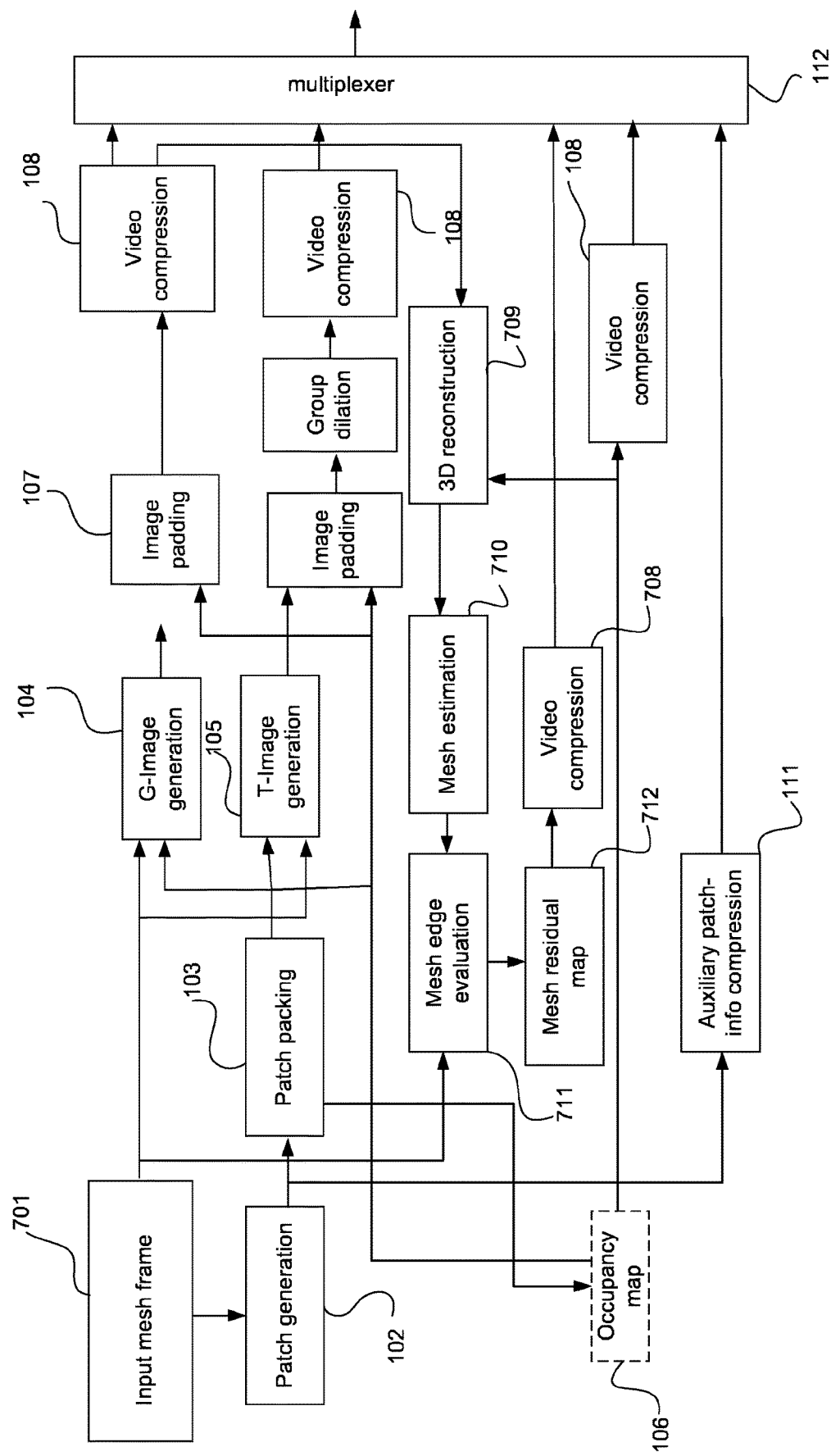
FIG. 7 shows an example of an encoding process according to an embodiment.

Alternatively to the previous embodiment (i.e. C; prediction of mesh edges in V-PCC), the prediction of mesh edges may be performed at the encoder in-loop, as shown in FIG. 7, with reference numbers 708-712.

After encoding the vertex locations in the geometry video, the vertex locations are decoded and reconstructed into a 3D space 709. Then, the prediction (estimation?) of mesh edges 710 as described in embodiment of "B Transmission of mesh edges in V-PCC—Based on nearest neighbor" is performed (excluding the attribute interpolation). The result is a 3D mesh that may be compared 711 against the original input mesh to generate a mesh edge residual map 712.

Mesh Edge Evaluation (FIG. 7; 711)

The inputs to the mesh edge evaluation is a reconstructed 3D mesh frame and its original (uncompressed) counterpart. The output of this process is a 2D frame representing the difference between the original and the reconstruction (prediction), i.e. a mesh residual map 712.

As the compression process may introduce some sort of loss, the two inputs will have a varying number of vertices and the vertices possibly do not exactly match in 3D position. Thus, a first step of the mesh edge evaluation is to establish corresponding vertices between the two inputs. Various methods can be applied here:

For example, a vertex "a" at position (x, y, z) in input mesh A is compared to the vertex closest to position (x, y, z) in input mesh B.

The robustness of these correspondences can be improved, e.g. by taking into account available attribute information (a vertex with a blue texture may not correspond to a vertex with a red texture), and running the correspondence matching in a symmetric fashion (confirm correspondences from A->B with correspondences from B->A).

Other methods for establishing vertex correspondence may be applied as well.

Once vertex correspondence has been established, the difference of the original vertex and its edges is compared to the reconstructed vertex and its predicted edges. Such differences may include, but are not limited to:

a) a different number of edge connections, for example the original vertex has more or fewer edge connections than the predicted reconstruction, e.g. due to simplification or loss in the edge connection signaling;
  b) a different connection topology, i.e. originally a vertex was not connected to its 3 closest neighbors, but to neighbors 3, 4, and 7 in terms of 3D distance;

c) a reconstructed vertex is not part of the original mesh, e.g. due to loss introduced in the V-PCC coding process.

Mesh Edge Residual Map (FIG. 7; 712)

Based on the differences detected in the Mesh edge evaluation step 711, a variety of residual information may be signaled to improve the reconstruction at the decoder side.

For example, a per-pixel difference value may be coded in a 2D video stream to signal the difference between number of edge connections in original and prediction to the decoder (case a), or a per-pixel index value may be coded in a 2D video stream to signal the difference in mesh topology to the decoder (case b), or a per-pixel binary may be coded in a 2D video stream to signal the removal of a vertex at a certain position to the decoder (case c).

The decoder can then use this information to alter the reconstructed 3D mesh to better match the original input.

The above-mentioned residual signals may be signaled separately as individual video frames or multiplexed into the same video stream.

As an example, a LUT (look-up table) can be defined to establish certain combination, for example for 5 mesh edge connections:

| luma pixel value, e.g. 8 bit (0..255) | meaning | decoder action |
| --- | --- | --- |
| 0 | vertex did not exist in original mesh | remove mesh |
| 10, 20, 30, 40 | too many vertex connections in prediction | remove 1, 2, 3 or 4 connections |
| 50, 60, 70, 80 | too few vertex connections in prediction | add 1, 2, 3 or 4 connections |
| 100, 110, 120, 130 | different mesh topology | skip first 1, 2, 3 or 4 NNs |
| 140 | different mesh topology | connect to 1, 2, 3 and 5 NNs |
| 150 | different mesh topology | connect to 1, 3, 4 and 6 NNs |
| 160 | different mesh topology | connect to 1, 2, 5 and 6 NNs |
| 170 | different mesh topology | connect to 1, 3, 5 and 6 NNs |
| ... | ... | ... |
| 250 | different mesh topology | connect to 1,2,4 and 6 NNs |

The actual residual signaling may differ from the above table.

E. Prediction of Mesh Faces

The face normal, that define the orientation of the face, can be estimated based on the normal of the points, i.e. based on the projection plane the points (vertices) belong to.

Figure 8:
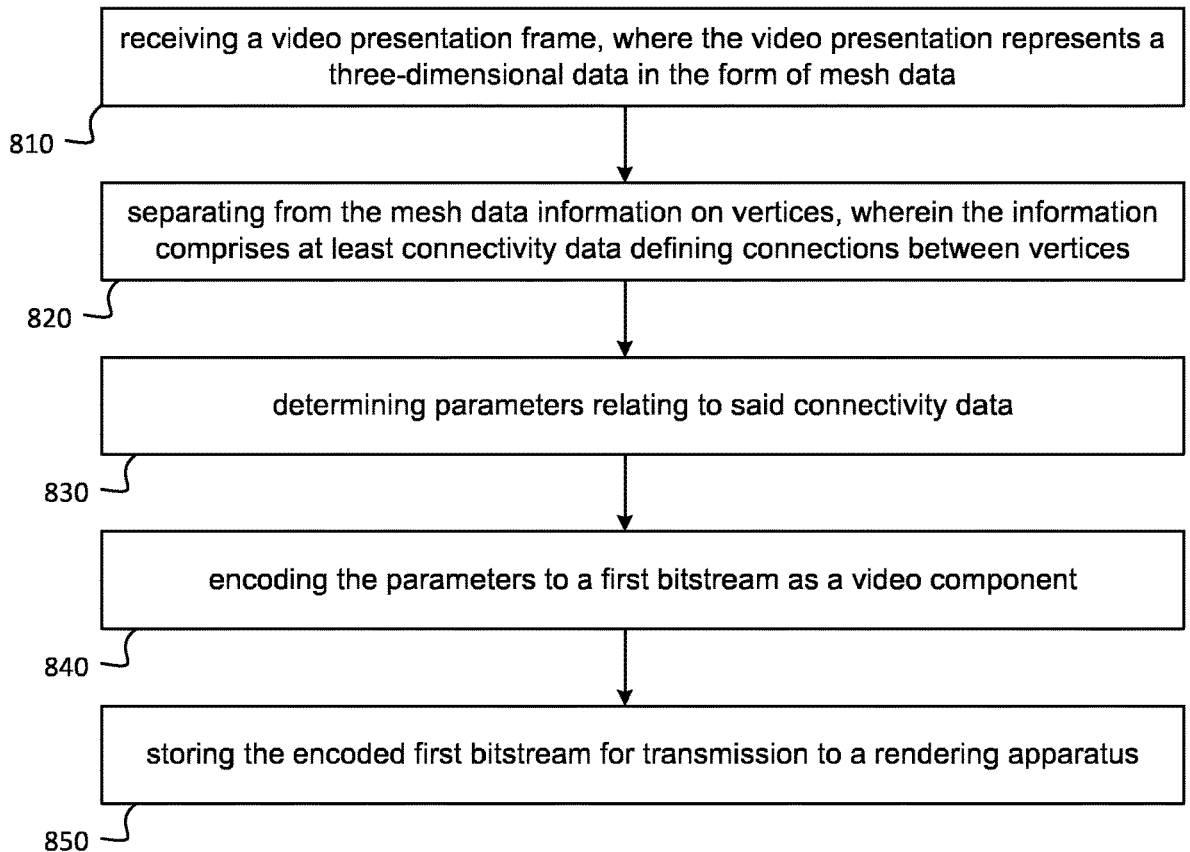
FIG. 8 is a flowchart illustrating a method according to an embodiment.

FIG. 8 is a flowchart illustrating a method for encoding according to an embodiment. A method comprises at least receiving 810 a video presentation frame, where the video presentation represents a three-dimensional data in the form of mesh data; separating 820 from the mesh data information on vertices, wherein the information comprises at least connectivity data defining connections between vertices; determining 830 parameters relating to said connectivity data; encoding 840 the parameters to a first bitstream as a video component; and storing 850 the encoded first bitstream for transmission to a rendering apparatus.

Figure 9:
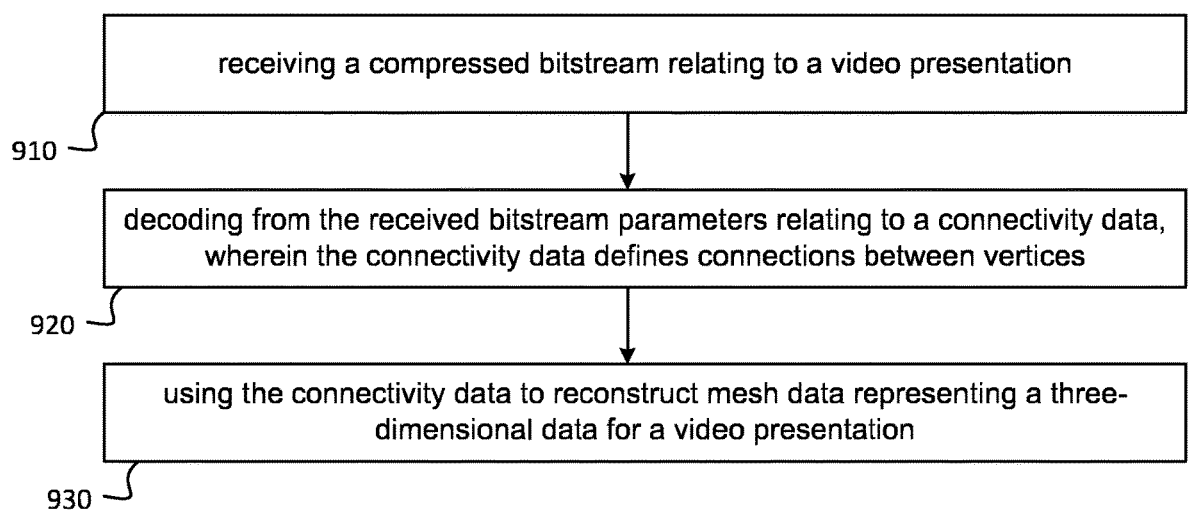
FIG. 9 is a flowchart illustrating a method according to another embodiment.

FIG. 9 is a flowchart illustrating a method for decoding according to another embodiment. A method comprises at least receiving 910 a compressed bitstream relating to a video presentation; decoding 920 from the received bitstream parameters relating to a connectivity data; wherein the connectivity data defines connections between vertices; using 930 the connectivity data to reconstruct mesh data representing a three-dimensional data for a video presentation.

An apparatus according to an embodiment comprises at least means for receiving a video presentation frame, where the video presentation represents a three-dimensional data in the form of mesh data; means for separating from the mesh data information on vertices, wherein the information comprises at least connectivity data defining connections between vertices; means for determining parameters relating to said connectivity data; means for encoding the parameters to a first bitstream as an additional video component; and means for storing the encoded first bitstream for transmission to a rendering apparatus. The means comprises at least one processor, and a memory including a computer program code, wherein the processor may further comprise processor circuitry. The memory and the computer program code are configured to, with the at least one processor, cause the apparatus to perform the method of flowchart in FIG. 8 according to various embodiments.

An apparatus according to another embodiment comprises at least means for receiving a compressed bitstream relating to a video presentation; means for decoding from the received bitstream parameters relating to a connectivity data; wherein the connectivity data defines connections between vertices; means for using the connectivity data to reconstruct mesh data representing a three-dimensional data for a video presentation. The means comprises at least one processor, and a memory including a computer program code, wherein the processor may further comprise processor circuitry. The memory and the computer program code are configured to, with the at least one processor, cause the apparatus to perform the method of flowchart in FIG. 9 according to various embodiments.

The three-dimensional data in the above examples can be a point cloud.

Figure 10:
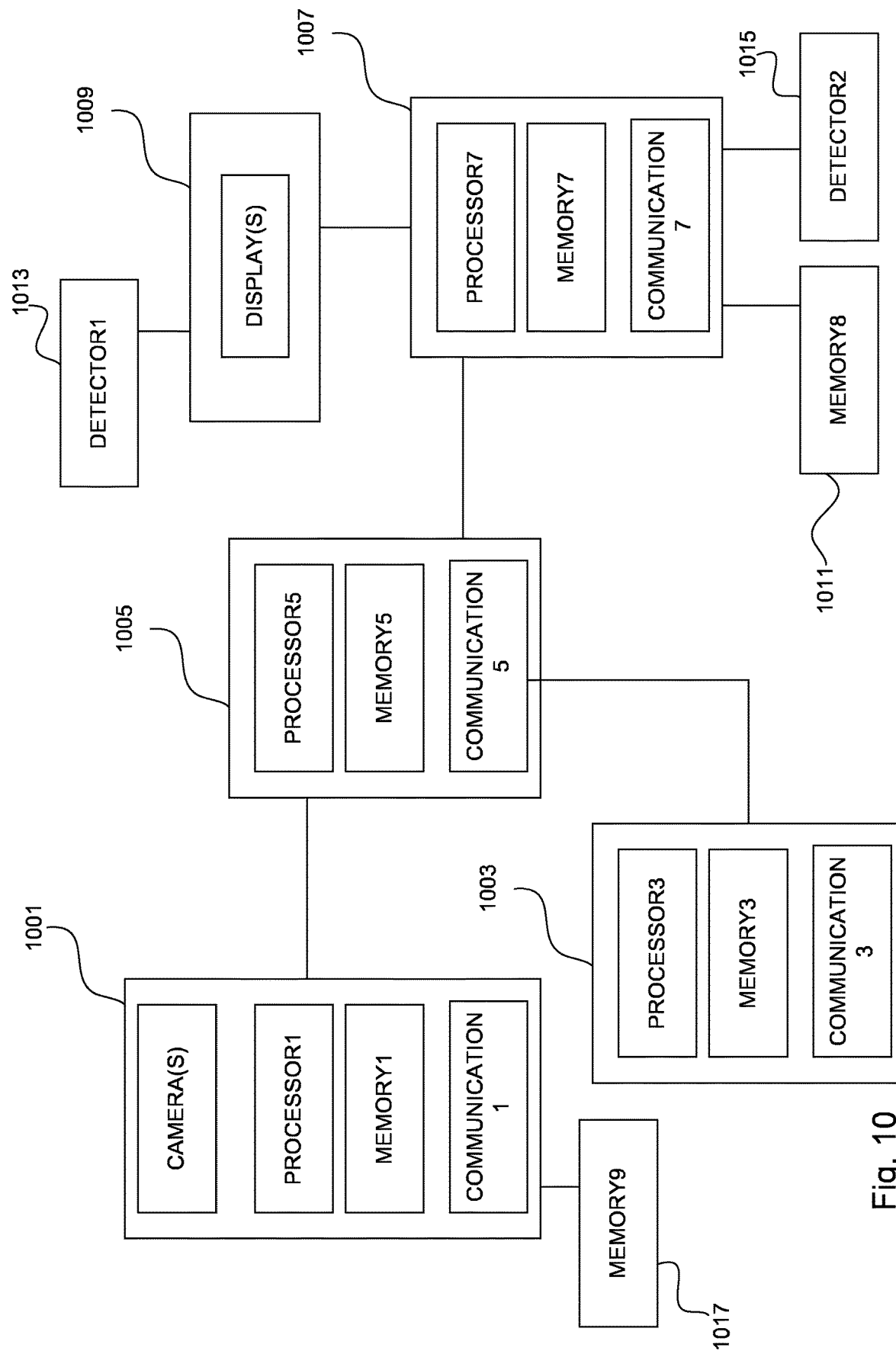
FIG. 10 shows a system according to an embodiment.

FIG. 10 shows a system and apparatuses for viewing volumetric video according to present embodiments. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of image with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 10 may comprise three parts: image sources 1001, 1003, a server 1005 and a rendering device 1007. An image source can be a video capture device 1001 comprising two or more cameras with overlapping field of view so that regions of the view around the video capture device is captured from at least two cameras. The video capture device 1001 may comprise multiple microphones (not shown in the figure) to capture the timing and phase differences of audio originating from different directions. The video capture device 1001 may comprise a high-resolution orientation sensor so that the orientation (direction of view) of the plurality of cameras can be detected and recorded The video capture device 1001 comprises or is functionally connected to a computer processor PROCESSOR1 and memory MEMORY1, the memory comprising computer program code for controlling the video capture device 1001. The image stream captured by the video capture device 1001 may be stored on a memory MEMORY1 and/or removable memory MEMORY9 for use in another device, e.g. in a viewer, and/or transmitted to a server 1005 using a communication interface COMMUNICATION1.

Alternatively, or in addition to the video capture device 1001 creating an image stream, or a plurality of such, one or more image source devices 1003 of synthetic images may be present in the system. Such image source devices 1003 of synthetic images may use a computer model of a virtual world to compute the various image streams it transmits. For example, the image source 703 may compute N video streams corresponding to N virtual cameras located at a virtual viewing position.

When such a synthetic set of video streams is used for viewing, the viewer may see a three-dimensional virtual world. The image source device 1003 comprises or is functionally connected to a computer processor PROCESSOR3 and memory MEMORY3, the memory comprising computer program code for controlling the image source device 1003. There may be a storage, processing and data stream serving network in addition to the video capture device 1001. For example, there may be a server 1005 or a plurality of servers storing the output from the video capture device 1001 or image source device 1003. The server 705 comprises or is functionally connected to a computer processor PROCESSOR5 and memory MEMORY5, the memory comprising computer program code for controlling the server 1005. The server 1005 may be connected by a wired or wireless network connection, or both, to sources 1001 and/or 1003, as well as the viewer devices 1009 over the communication interface COMMUNICATION5.

For viewing the captured or created video content, there may be one or more viewer devices 1009 (a.k.a. playback devices). These viewer devices 1009 may have one or more displays, and may comprise or be functionally connected to a rendering module 1007. The rendering module 1007 comprises a computer processor PROCESSOR7 and memory MEMORY7, the memory comprising computer program code for controlling the viewer devices 1009. The viewer devices 1009 may comprise a data stream receiver for receiving a video data stream from a server and for decoding the video data stream. The data stream may be received over a network connection through communications interface, or from a memory device 1011 like a memory card. The viewer devices 1009 may have a graphics processing unit for processing of the data to a suitable format for viewing. The viewer device 709 can be a high-resolution stereo-image head-mounted display for viewing the rendered stereo video sequence. The head-mounted display may have an orientation detector 1013 and stereo audio headphones. According to an embodiment, the viewer device 1009 is a display enabled with 3D technology (for displaying stereo video), and the rendering device 1007 may have a head-orientation detector 1015 connected to it. Alternatively, the viewer device 1009 may comprise a 2D display, since the volumetric video rendering can be done in 2D by rendering the viewpoint from a single eye instead of a stereo eye pair. Any of the devices 1001, 1003, 1005, 1007, 1009 may be a computer or a portable computing device, or be connected to such. Such devices may have computer program code for carrying out methods according to various examples described in this text.

As mentioned, the viewer device can be a head-mounted display (HMD). The head-mounted display comprises two screen sections or two screens for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module for determining the head movements and direction of the head. The head-mounted display gives a three-dimensional (3D) perception of the recorded/streamed content to a user.

Figure 11:
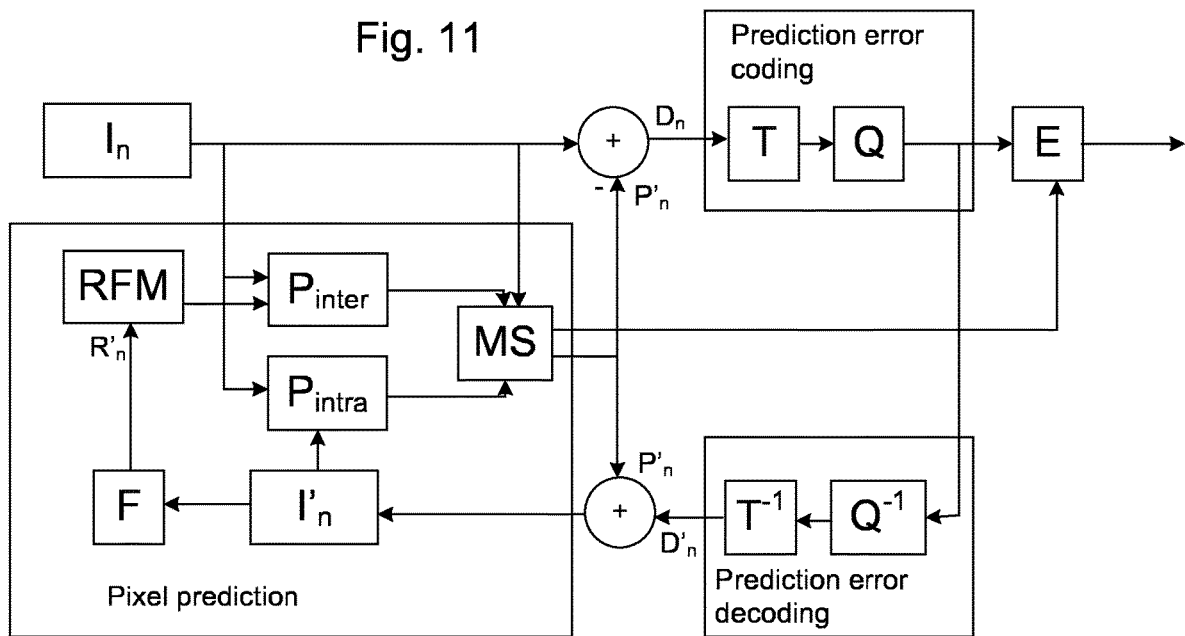
FIG. 11 shows an encoding process according to an embodiment.
Figure 12:
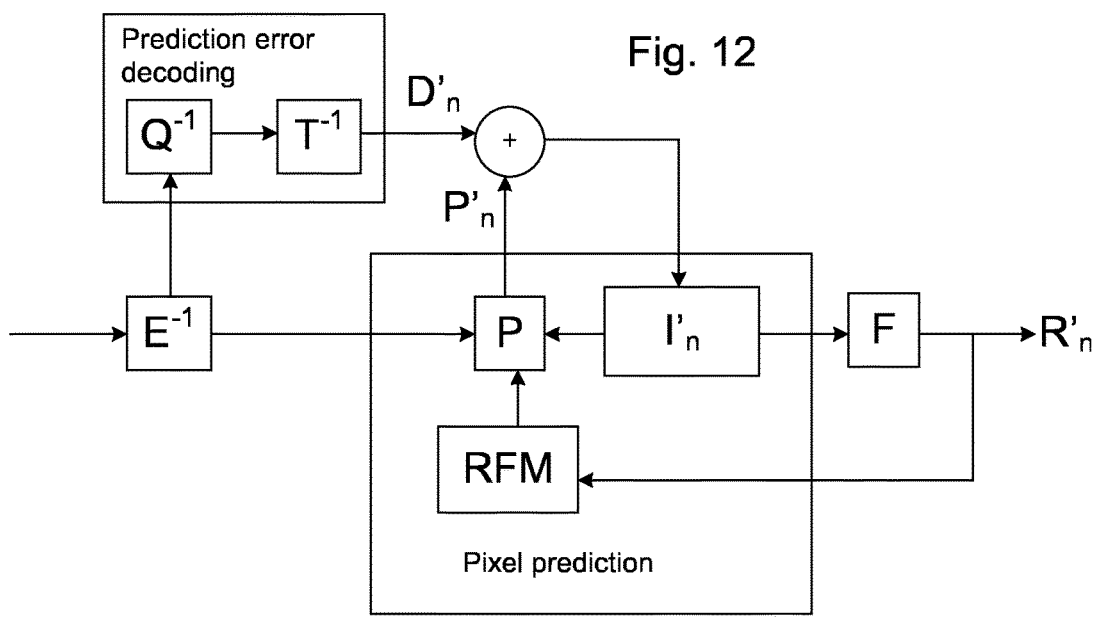
FIG. 12 shows an decoding process according to an embodiment.

The video material captured or generated by any of the image sources can be provided for an encoder that transforms an input video into a compressed representation suited for storage/transmission. The compressed video is provided for a decoder that can uncompress the compressed video representation back into a viewable form. The encoder may be located in the image sources or in the server. The decoder may be located in the server or in the viewer, such as a HMD. The encoder may discard some information in the original video sequence in order to represent the video in a more compact form (that is, at lower bitrate). An example of an encoding process is illustrated in FIG. 11. FIG. 11 illustrates an image to be encoded ($I''$); a predicted representation of an image block ($P'''$); a prediction error signal ($D''$); a reconstructed prediction error signal ($D'''$); a preliminary reconstructed image ($I'''$); a final reconstructed image ($R'''$); a transform (T) and inverse transform ($T^{-1}$); a quantization (Q) and inverse quantization ($Q^{-1}$); entropy encoding (E); a reference frame memory (RFM); inter prediction ($P^{inter}$); intra prediction ($P^{intra}$); mode selection (MS) and filtering (F). An example of a decoding process is illustrated in FIG. 12. FIG. 12 illustrates a predicted representation of an image block ($P'''$); a reconstructed prediction error signal ($D'''$); a preliminary reconstructed image ($I'''$); a final reconstructed image ($R'''$); an inverse transform ($T^{-1}$); an inverse quantization ($Q^{-1}$); an entropy decoding ($E^1$); a reference frame memory (RFM); a prediction (either inter or intra) (P); and filtering (F).

The various embodiments may provide advantages. For example, the present embodiments provide lossy compression of mesh edge connectivity. In addition, the present embodiments may provide mesh edge connectivity compression within V-PCC without additional decoder. Mesh edge prediction according to embodiments may reduce bit rate requirements. Mesh edge prediction residual signaling may improve reconstruction quality.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system according to an embodiment comprises at least the steps as defined by a flowchart of FIG. 8 or FIG. 9.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
  receiving a video presentation frame, wherein the video presentation frame represents a three-dimensional data in the form of mesh data;
  determine information related to vertices from the mesh data, wherein the information related to vertices comprises at least connectivity data defining connections between vertices;
  determining parameters relating to said connectivity data;
  storing the parameters in a first bitstream as a video component;
  storing the first bitstream for transmission to a rendering apparatus;
  generating a mesh connectivity map with using a mesh connectivity table, wherein the connectivity data comprises the mesh connectivity map;
  wherein the mesh connectivity map signals per veliex indices of connected neighboring
  vertices, and wherein the mesh connectivity map packs mesh connectivity information per vertex in a number of one or more bits;
  wherein the information related to vertices further comprises information related to vertex coordinates and attributes, which are stored into a second bitstream, wherein the method further comprises creating a final bitstream from the first bitstream and the second bitstream; and
  forming a mesh edge residual map, wherein the mesh edge residual map is formed as a lookup table, wherein an index in the lookup table corresponds to a luma pixel value that conveys mesh edge connection information configured to be used to reconstruct the mesh data.

2. The method according to claim 1, wherein values for the mesh connectivity map comprise a sum of indices to neighboring vertices.

3. The method according to claim 1, wherein the connectivity data comprises a number of edges per vertex as a value in a luma channel.

4. The method according to claim 1, further comprising encapsulating the connectivity data in an unused chroma channel of a geometry video.

5. The method according to claim 1, wherein the connectivity data is embedded in an occupancy map.

6. The method according to claim 1, wherein the luma pixel value that corresponds to the index in the lookup table is an 8-bit luma pixel value.

7. The method according to claim 1, wherein the mesh connectivity map packs the mesh connectivity information per vertex in a single byte.

8. A method, comprising:
  receiving a bitstream relating to a video presentation;
  determining, from the received bitstream, parameters relating to a connectivity data, wherein the connectivity data defines connections between vertices;
  determining, from the received bitstream, information related to vertex coordinates and attributes; and
  using the connectivity data and the information related to vertex coordinates and attributes to reconstruct mesh data representing a three-dimensional data for the video presentation;
  wherein the connectivity data comprises a mesh connectivity map that is based on a mesh connectivity table, wherein the mesh connectivity map signals per vertex indices of connected neighboring vertices, and wherein the mesh connectivity map packs mesh connectivity information per vertex in a number of one or more bits;
  wherein the mesh data is reconstructed using mesh edge connection information conveyed with a mesh edge residual map, wherein the mesh edge residual map is formed as a lookup table, wherein an index in the lookup table corresponds to a luma pixel value that conveys the mesh edge connection information.

9. The method according to claim 8, further comprising predicting mesh edges based on the connectivity data, wherein the predicting comprises:
  determining vertex locations;
  reconstructing the vertex locations into a three-dimensional mesh frame;
  determining a difference between the reconstructed three-dimensional mesh frame and an original input three-dimensional mesh frame to generate a vertex correspondence; and
  forming the mesh edge residual map as a two-dimensional frame based on the vertex correspondence generated with determining the difference between the reconstructed three-dimensional mesh frame and the original input three-dimensional mesh frame.

10. The apparatus according to claim 8, wherein values for the mesh connectivity map comprise a sum of indices to neighboring vertices.

11. An apparatus comprising:
  at least one processor; and
  at least one memory storing instructions that, when executed by the at least one processor, cause the apparatus at least to:
  receive a video presentation frame, wherein the video presentation frame represents a three-dimensional data in the form of mesh data;
  determine information related to veltices from the mesh data, wherein the information related to vertices comprises at least connectivity data defining connections between vertices;
  determine parameters relating to said connectivity data;
  store the parameters in a first bitstream as a video component;

store the first bitstream for transmission to a rendering apparatus;

generate a mesh connectivity map with using a mesh connectivity table, wherein the connectivity data comprises the mesh connectivity map;

wherein the mesh connectivity map signals per vertex indices of connected neighboring vertices, and wherein the mesh connectivity map packs mesh connectivity information per vertex in a number of one or more bits;

wherein the information related to vertices further comprises information related to vertex coordinates and attributes, which are stored into a second bitstream, wherein the apparatus is further caused to create a final bitstream from the first bitstream and the second bitstream; and form a mesh edge residual map, wherein the mesh edge residual map is formed as a lookup table, wherein an index in the lookup table corresponds to a luma pixel value that conveys mesh edge connection information configured to be used to reconstruct the mesh data.

12. The apparatus according to claim 11, wherein the connectivity data comprises a number of edges per vertex as a value in a luma channel.

13. The apparatus according to claim 11, wherein the apparatus is further caused to:
encapsulate the connectivity data in an unused chroma channel of a geometry video.

14. The apparatus according to claim 11, wherein the connectivity data is embedded in an occupancy map.

15. An apparatus comprising:
at least one processor; and
at least one memory storing instructions that, when executed by the at least one processor, cause the apparatus at least to:
receive a bitstream relating to a video presentation;
determine, from the received bitstream, parameters relating to a connectivity data;
wherein the connectivity data defines connections between vertices;
determine, from the received bitstream, information related to vertex coordinates and attributes; and
use the connectivity data and the information related to vertex coordinates and attributes to reconstruct mesh data representing a three-dimensional data for a video presentation;
wherein the connectivity data comprises a mesh connectivity map that is based on a mesh connectivity table, wherein the mesh connectivity map signals per vertex indices of connected neighboring vertices, and wherein the mesh connectivity map packs mesh connectivity information per vertex in a number of one or more bits;
wherein the mesh data is reconstructed using mesh edge connection information conveyed with a mesh edge residual map, wherein the mesh edge residual map is formed as a lookup table, wherein an index in the lookup table corresponds to a luma pixel value that conveys the mesh edge connection information.

16. The apparatus according to claim 15, wherein the luma pixel value that corresponds to the index in the lookup table is an 8-bit luma pixel value.

17. The apparatus according to claim 15, wherein the mesh connectivity map packs the mesh connectivity information per vertex in a single byte.

18. The apparatus according to claim 15, wherein the apparatus is further caused to predict mesh edges based on the connectivity data, wherein the predicting comprises:
determining vertex locations;
reconstructing the vertex locations into a three-dimensional mesh frame;
determining a difference between the reconstructed three-dimensional mesh frame and an original input three-dimensional mesh frame to generate a vertex correspondence; and
forming the mesh edge residual map as a two-dimensional frame based on the vertex correspondence generated with determining the difference between the reconstructed three-dimensional mesh frame and the original input three-dimensional mesh frame.

* * * * *